US012776017B2

(12) United States Patent
Tichelaar

(10) Patent No.: US 12,776,017 B2

(45) Date of Patent: Oct. 27, 2026

(54) HDR OUT OF GAMUT ADJUSTED TONE MAPPING

(71) Applicant: KONINKLIJKE PHILIPS N.V., Eindhoven (NL)

(72) Inventor: Johannes Yzebrand Tichelaar, Eindhoven (NL)

(73) Assignee: Koninklijke Philips N.V., Einhoven (NL)

( * ) Notice: Subject to any disclaimer, the term of this patent is extended or adjusted under 35 U.S.C. 154(b) by 0 days.

(21) Appl. No.: 19/153,468

(22) PCT Filed: Jan. 29, 2024

(86) PCT No.: PCT/EP2024/052065

§ 371 (c)(1),
(2) Date: Aug. 4, 2025

(87) PCT Pub. No.: WO2024/165359

PCT Pub. Date: Aug. 15, 2024

(65) Prior Publication Data

US 2026/0237035 A1 Aug. 13, 2026

(30) Foreign Application Priority Data

Feb. 8, 2023 (EP) .................................... 23155528

(51) Int. Cl.

*H04N 9/67* (2023.01)
*G06T 5/92* (2024.01)
*G06T 7/90* (2017.01)

(52) U.S. Cl.

CPC .................. *G06T 5/92* (2024.01); *G06T 7/90* (2017.01); *H04N 9/67* (2013.01); *G06T 2207/10024* (2013.01); *G06T 2207/20208* (2013.01)

(58) Field of Classification Search

CPC ... H04N 9/67; H04N 9/64; H04N 9/69; G06T 5/92; G06T 7/90; G06T 2207/10024; G06T 2207/20208

(Continued)

(56) References Cited

U.S. PATENT DOCUMENTS

2018/0234704 A1* 8/2018 Atkins .................... H04N 9/67
2019/0206360 A1 7/2019 Strom et al.

(Continued)

FOREIGN PATENT DOCUMENTS

EP 3537697 A1 9/2019
WO 2016020189 A1 2/2016
WO 2017157977 A1 9/2017

OTHER PUBLICATIONS

International Search Report and Written Opinion from PCT/EP2024/052065 dated Mar. 6, 2024.

*Primary Examiner* — Sherrie Hsia

(57) ABSTRACT

To get easy correction of typical out of gamut mapping issues when liberally applying desired luma mapping functions to luma/chrominance color representations, the inventor proposes an apparatus (500), or method, for transforming an input pixel color (C_Hb) of a high dynamic range input image into an output color (C_Sb) of an output image, wherein the input color is represented as a gamma-log-defined triplet comprising an initial first color component, an initial second color component and an initial third color component according to an opto-electronic transfer function which has a gamma-log shape, wherein the apparatus comprises a color transformation circuit (501) arranged to transform the initial first, second and third color component into an intermediate red color component (R"_im), an intermediate green color component (G"_im) and an intermediate blue color component (B"_im) by mapping the initial color (Continued)

components with a function which is the same for each color component, wherein the function has a slope larger than 1 for a sub-range comprising the darkest color component values of the initial color components, characterized in that the apparatus comprises: —a first maximization circuit (551) arranged to calculate a first value (Mx) which is for each input color the largest one of the three intermediate color components; —a first subtractor (552) arranged to subtract from the value a second value (V2) which is equal to a value obtained from applying the opto-electronic transfer function to a tertiary value, which tertiary value is equal to a target display maximum luminance for the output image (ML_To) divided by a maximum luminance associated with the opto-electronic transfer function (ML_PQ), which subtraction yields a fourth value (V4); —a second maximization circuit (553) arranged to calculate a fifth value which is the highest one of the fourth value and zero; —a second subtractor (554), a third subtractor (555) and a fourth subtractor (556) arranged to calculate three output color components (R"_out, G"_out, B"_out) by subtracting the fifth value from the corresponding intermediate color component, and arranged to set the output color component equal to zero if the subtraction yields a negative value.

8 Claims, 6 Drawing Sheets

(58) Field of Classification Search
USPC ................ 348/577, 708, 659–661, 675, 676; 345/589–591, 604; 382/162, 167
See application file for complete search history.

(56) References Cited

U.S. PATENT DOCUMENTS

2021/0231055 A1 7/2021 Beaulieu
2021/0272497 A1 9/2021 Tichelaar et al.

* cited by examiner

HDR OUT OF GAMUT ADJUSTED TONE MAPPING

CROSS-REFERENCE TO PRIOR APPLICATIONS

This application is the U.S. National Phase application under 35 U.S.C. § 371 of International Application No. PCT/EP2024/052065, filed on Jan. 29, 2024, which claims the benefit of EP Patent Application No. EP 23155528.5, filed on Feb. 8, 2023. These applications are hereby incorporated by reference herein.

FIELD OF THE INVENTION

The invention relates to luminance-changing color mapping for high dynamic range images, in particular for down-grading to a lower maximum luminance output image. The techniques can be used in HDR image or video coders.

BACKGROUND OF THE INVENTION

FIG. 1 illustrates image creation, coding, and displaying according to so-called low dynamic range (LDR) a.k.a. standard dynamic range (SDR) video specification. This technology has been applied in electronic television broadcast (and similar technologies like e.g. blu-ray disks) since approximately the 1940s. It was technically formulated in correspondence with the technical possibilities at the time. Although it has its limitations, the technology was seen sufficient for communicating anything from a royal marriage to the landing on the moon. Some aspects relevant for the present innovations are described, and the many other aspects (e.g. how to digitize an analog video signal and compress it according to an MPEG standard) are left to the domain of the video skilled person.

The original analog SDR video representation system (NTSC or PAL) was developed around cathode ray tube displays (CRTs), and "inverse" CRT cameras (later other camera technologies like CCD and CMOS were developed, and other display technologies like plasma display and liquid crystal display (LCD), but those were technically configured to behave like the CRT, to match with the SDR video coding standard which was left unchanged).

A camera 100 will make a voltage signal (V) to be communicated e.g. via a broadcast tower, to a television display 150, at a consumer's home. The voltage signal will drive a cathode 151, which emits an amount of electrons in an electron beam 152, depending on the controlling voltage applied to the cathode. The time-varying voltage will be deflected by coils, so that it scans sequential positions on the display's screen, in a zigzag pattern until the whole image has been generated, and it is time to fly back to the origin position of the screen to display the next image of the video sequence. For any scan position of a certain electron beam deflection angle, the corresponding red, green or blue phosphor on the screen is excited by the electrons, and an amount of photons is emitted which is substantially linearly proportional to the amount of impinging electrons (which was controlled by the signal voltage V which defines the image content). As the cathode is a quantum mechanical object, the amount of electrons being emitted by it is not linearly proportional to the driving voltage. Its innate physical behavior can be modeled by a power function, which is approximately a square power. This means that if our voltage at time t2 is to code an object which should look twice as bright on the screen as another object corresponding to a position ("pixel") or time t1, one should not make V2=2*V1, but rather V2=sqrt(2)*V1, where sqrt is the inverse of the square power, i.e. the square root.

Since all CRT displays of all consumers behave like this, the cameras of the broadcaster will take care of the square root precompensation.

E.g., when the lens 101 images scene light on a pixel of a sensor 102 of the CMOS type, such a CMOS sensor is usually substantially linear. If twice the amount of scene photons fall on the pixel, then the pixel voltage will be twice as high (or a digital number which is output from an analog-digital convertor working on the voltage will also be twice as high). Therefore, to generate a (digital or analog) output signal V, the camera uses a signal converter 110 which applies the square root function.

This creates a relative (scene-referred) system of coding object brightnesses in a scene, which is what is technically needed to be able to display good looking representative images for the human eye and brain. E.g., in the PAL standard, the brightness (or more correctly, the square root of a relative measure of the amount of light from a scene object) was a voltage value between substantially 0 (for the blacks) and 700 mV (for the brightest possible represented brightness, which is considered and perceived to be a clean white object). The value 700 mV which codes the white objects, or in the digital era the luma (Y) code 255, is called 100% brightness (or 1.0).

SDR systems have a definition which allows a brightness dynamic range (i.e. the brightest displayed pixel versus the darkest) of about 1000:1. In an analog system this depends mostly on the noise on the voltage, but in a typically 8 bit digital representation like in the standardized Rec. 709 codec, there are only codes for coding brightnesses or grey values between 1 and 1/1000. This is corresponding to and sufficient for typical displaying, which-depending on the surround illumination such as daytime viewing—may be lower than 50:1, but on average one could see that with SDR technologies viewers get to see displayed pixels between approximately 1 nit blacks and 100 nit whites.

FIG. 1A shows what typically happens from a signal data point of view. The scene objects are illuminated by an often uncontrollable (and at display time unknown) amount of scene illumination, which typically should conform only to the requirement that there shall be sufficient light. In studios one typically hangs a grid of lights from the ceiling, which create reasonably uniform illumination at all important spots in the scene (base lighting). So e.g. a dark, black shoe standing at the back of the scene being captured, will be illuminated by approximately the same amount of illumination (IL) as a white piece of paper lying on a table in the middle of the scene. On top of that one can create some dedicated light effects, to put e.g. a shiny object in a spotlight, but it may quickly happen that parts of that object become so bright that any further brightness increase is clipped to the same value in the captured signal (pixel wells fill up to their maximum capacity, the ADC outputs its maximum code, e.g. power(2;14), and the Y of the rec 709 YCbCr pixel color digital code will be 255, for bright scene pixels just as for brighter scene pixels. In any case, apart from a little bit of highlight, and a little bit of dark shadowing, the SDR signal will mostly encode the own colors of the objects (under uniform illumination). This own color, i.e. the amount of red, green and blue, or just light in total that any object reflects (e.g. 90% or 0.9 for the white paper), will lead to a scene luminance Lsc of the object (e.g. the scene luminance of the white paper LSc_pw, or of the black shoe Lsc_bs, which will typically reflect 10% or less of the infalling light, also towards the camera lens), and finally in a linear manner lead to an amount of photons falling into the pixel which images that area of the scene, and hence finally a luma Y, which is the square root of that relative brightness measurement of the pixel (and the sqrt also happens to be a reasonable first approximation of how humans perceive lightness of objects).

A further property of SDR imaging technologies, is that the scene luminances don't matter at all, and don't come into play. Not only is the e.g. 1 billion nit of the sun disk not a reasonable displayed pixel luminance of what we want to see on a screen when watching e.g. a movie or sports program, but all the settings of the camera such as iris, shutter, amplifier, neutral density filter and potentially non-linear modifiers such as camera function knee, make that the relative brightness output signal, i.e. in digital SDR video the luma Y, is not easily convertible to scene luminance.

But importantly (apart from a minor gamma correction due to a difference in viewing surround between viewing room and original scene), the relative proportions of the luminances of the pixels as displayed (Ld) will be substantially equal to the proportions in the scene (except for clipping and the like), because the sqrt non-linearity is removed by its inverse square power.

This means that the adapted human eye and brain, will see a reasonable approximation of the original scene, at least it will see that an object looks e.g. like middle grey between black and white objects, because it has a relative luminance, or brightness, of approximately $\frac{1}{4}^{th}$ of white (or 100%).

SDR imaging chains (i.e. capturing up to displaying) were relative in another aspect. The luma codes were used as a driving or control signal for the display, so the maximum controllable value (Y=255) drove the display to the maximum it could (would) show, whatever that be. On average Y=255 may display as Ld=100 nit. But if one bought a brighter display, it could easily show as 200 nit (maybe even up to 500 nit for the brightest displays). In addition, there was typically a brightness control knob 170. Even though some consumer bought a 300 nit capable TV, with the knob he could dim it so that the brightest objects (defined as Y=255 in the image) would never show brighter than 100 nit anyway. So it was undefined what displayed luminances Ld the image color codes, in particular the luma Y, would yield, and they were also not directly corresponding to scene luminances. However, in the relative view things worked: the so-called white-on-white principle would map "the white" in the scene (e.g. a bridal gown) onto the white code (Y=255) and then on the brightest pixel any of the consumer-side displays would display (which as said for one consumer could be 100 nit, and for another 80, but the adaptation properties of human vision would make the two images look substantially identical, at least when seen on their own as usual, and not side by side as in the shop).

However, as newly invented displays (for starters LED matrix backlit LCD displays) had the potential of becoming ever brighter, it became clear that showing an SDR 100% white as a 700 nit maximum display luminance, was no longer a reasonable displaying of an SDR image (several customers may under certain conditions consider this exaggeratedly bright), or better formulated, the simple SDR signal would no longer be the best image one could show on such highly capable display.

One could aim for something better, which tries to display not just the own colors of objects under substantially uniform illumination, but naturalistic scenes, in which there are quite dark corners, and quite bright areas (e.g. sunlit scenes outside the window, which in SDR typically clip to undistinguishable white, or bright objects such as light bulbs, more realistic specular reflections on metals, etc.).

The simplest definition of High Dynamic Range (HDR) images, is any image which can encode something brighter than 100%, e.g. 400% or even 1000% (in which system one could make some pixels relatively 10× brighter than the paper white). The television does not yet know in a unique or standardized manner how to deal with such new signals, but it may display e.g. 1000% as its maximum displayable luminance ML_D of 700 nit, and then the other luminances (when still following the above described linear white-on-white technical approach) will fall approximately good, or reasonable. E.g., the white paper would display at 70 nit, which is close to the approximate 100 nit it would get on the average SDR display. So the normal diffusively reflecting objects in the scene would look similar to how they would look on an SDR display (which couldn't show the 10× brighter pixels), yet at the same time reasonably coordinated with the brighter displayed pixels, like e.g. a 700 nit light bulb hanging from the ceiling (as said, the original scene luminance Lsc of such a bulb not being as important as the property of visually getting a naturalistic above-average bright bulb in the displayed HDR image).

So that would seem a quite reasonable technical approach for designing a novel HDR coding framework (although there happened to be some caveats).

This is exactly how one of the current HDR video codecs in the market, BBC's Hybrid Loggamma (HLG) codec, defined their HDR approach. They extended the square root function further than 1.0 (whilst going from 8 to 10 bits to have enough code points along the extended Opto-to-Electronic Transfer curve, which defines how relative brightnesses from the camera are encoded as corresponding lumas), although not with a continuing square root definition but turning into a logarithmic shape above the halfway point (Y=0.5*1023). This has the advantage that the darkest colors in an image behave exactly as expected, i.e. as under SDR imaging, because the display applies the square power to those lumas, hence the relative display luminances, and consequently the lightness or greyness of the objects, still behaves conserved as explained with FIG. 1A. The relationship between object brightnesses gets distorted by the logarithm for brighter scene or image objects, but that is required to compress the larger HDR dynamic range into a smaller range, e.g. suitable for direct (i.e. without brightness optimization TV-internal processing) display on lower dynamic range displays, such as legacy LDR displays. In addition to being a natural approach to HDR, it is a nicely simple approach to create somewhat more impressive dynamic range extended images, but has its limitations.

One of the issues resides in the fact that such an entirely relative system, will still display the brightest coded pixel (which as said represents no actual luminance, though one could pretend it corresponds to e.g. a desired estimated 1000 nit approximately) as whatever any display will be able to. So that might perhaps be okay for a 700 nit ML_D capability display, or a 1000 nit display, or even a 2000 nit display, but on a e.g. future 6000 nit display, certain images having Y=1023 maximum luma codes may look excessively bright. The solution of the HLG framework is that some corrective gamma is applied for brighter displays, which at least lowers the middle brightnesses, although it still displays the brightest pixel rather arbitrarily.

Relative, scene-referred technical proponents argue that any absolute system would have at least two problems. On the one hand images may be generated which contain far brighter intended pixels (e.g. the video creator defines in the video that some pixels should ideally be shown as bright as 10,000 nit) that what many actual consumer displays could show (e.g. a ML_D=500 or 1500 nit display). On the other hand, viewing environments can be highly variable (although one could decide to watch a movie under average evening illumination instead with a sun beam directly hitting the tv screen), and absolute systems would not account for visual adaptation, and need to post-process inputted HDR videos for that aspect too. But HLG would also need to compensate (one still has only one hardware capability HLG-understanding display and variable viewing environments), and at least by making everything explicit and absolute, it is accounted for in a professional rather than quick manner, enabling any need.

So all the other HDR video codec developers, starting with Philips-Technicolor and Dolby, and thereafter Samsung's HDR10+ and others, worked in an absolute system (working on the basis of defining pixel luminances, rather than relative brightness encodings, which was a major paradigm change in video tech) which we will now describe. Although the below innovations could also be useful for relative systems, we will elucidate them in their absolute variant, for which they are particular useful. The modern future-proof HDR codec framework required a number of innovative technical insights, with one change necessitating another, and we will now summarize some of the core aspects with the aid of FIG. 2.

The absolute approach is not just about defining "just any luminance" for the various pixels, as that would still not be stably defined. The importance of stable definition can be understood in that there can be many components in the system which play on the pixel brightnesses, which set of sliding scales make that there is no guarantee at all that the end consumer gets to see even a vague approximation of the beautiful images that the content creator made and intended everybody would see. E.g. the creator can make a flashlight beam of a certain brightness, for it to search for a monster in the shadows having a certain darkness, but if e.g. the consumer tv changes the brightness of the monster and the light beam, just anything can come out, and the movie may become different. As FIG. 2 illustrates that there can be a need of several intermediate conversions at least in some market deployments, it is important to define things well, starting from a good first line definition.

This first line stable definition is associating a target display (which has a target display maximum luminance ML_T) with a video, and creating the video in harmony with that target display. The selection of a well-working ML_T, can be likened with selecting an aspect ratio for geometric composition optimization. Say one wants to paint a still life, e.g. tangerines organized around a vase. One will then elect an aspect ratio which is approximately 1:1. If one had to position tangerines around a vase on a 3:1 canvas, one either had to spread them around linearly, which doesn't show the same composition, or leave half of the canvas blank, which is also not optimal. On the other hand when painting a beautiful landscape, 1:1 will in a disappointing manner only represent a narrow cut of that landscape. It is important that after the basic election of the canvas, one will still optimize where exactly the tangerines lie around the vase-a little more to the right, or the front, or how the landscape covers the 3:1 canvas exactly.

The same happens in the HDR image generation (which without wanting to be limiting we shall call the master HDR image, which is the first image grading created, in case there may be several different gradings of any image of a scene (scn) at a certain time; grading means determining the pixel colors and in particular their luminances to satisfaction), but then with image pixel luminances. The creator will elect e.g. a 4000 nit ML_T target display, because the video he is going to make contains an expressive set of explosion fireballs, somewhere down the story. According to e.g. his artistic preferences, he judges that any pixel luminance below approximately 90%*4000 nit (the reduction of luminance for making yellows) will look too feeble. It is still an explosion, and on lesser capability displays one will have to make do, but that doesn't mean one has to define the created images themselves with lesser HDR quality. 6000 nit ML_D may be too high for such a scene, or unnecessary. Thereafter, having elected the target display, the actual video images will be optimized corresponding to, and specifically for this target display (the name target points to that ideally the end consumer should buy an actual end-user display with such a display maximum luminance ML_D, although consumers will of course not buy a different dedicated TV for each different ML_T video, although one could buy a very high ML_D display which could handle most of the videos; a 7000 nit ML_D display may then e.g. not use the range 4000-7000 nit range and display a 4000 nit ML_D video equi-luminance, or it may somewhat boost the e.g. 3500-4000 nit incoming master HDR video image pixels, so that they display e.g. in the range up to 5000 nit). When making a video for a 4000 nit ML_T target display, it is expectable that one makes no pixels in any image brighter than 4000 nit. Many or all pixels in many images can be lower than 4000 nit though. But it is also expectable that if one claims a video to be a powerful 4000 nit HDR video, there is going to be at least some object in some image which has pixel luminances close to 4000 nit (unless it is a video of only dark scenes, to be merged with other 4000 nit videos).

Not only the maximum luminance will be determined, but all pixel luminances will be optimized, i.e. determined at least to satisfaction. I.e., for each image object in each scene's image, one must elect for the object pixels luminance values between 0 and 4000 nit (or for dark-savvy HDR systems one will also mind a minimum black, say e.g. 0.01 nit being pragmatic for home television viewing, but we will keep explanations reasonably simple by focusing on the bright end). Visually, the impact of the fire ball depends on the luminance of the surrounding pixels, and e.g. the visibility of the dark shadow areas depend on the fireball, its average luminance, spatial extent and duration, etc. (no dark without light, and no light without dark). So e.g. the luminances of the monster hiding in the dark in the scene following the explosion, may and will typically depend on the fireball, and hence be consistently specified.

FIG. 2A shows the typical image processing results, technically on an axis of possible luminances of some key objects in an exemplary HDR scene image (a dark shoe, a white piece of paper, and an above-white ultra-bright object being a light bulb). What happens in details depends on the specific technical embodiment of video technology (e.g. pre-recorded material unicasted over a dedicated internet connection, etc.), but we elucidate principles in general, to the extend needed for understanding this innovation. As usual a (typically HDR) camera 201 captures real world objects (204) in a scene (we ignore for now inclusion of computer-generated image material). The real world luminances of the scene as explained don't matter, apart from the fact that relevant luminances for a master HDR image (Mstr) will be derived for them (this may happen with a simple function like in broadcasting, but in off-line movie making the relationship may be far looser, with local adjustments of some object's image pixel, to the extent that the original captured image may only serve for the geometric positioning of the image, which gets an entirely new colorimetry). So although complicated grading processing may be involved, for simplicity of explanation we will assume that whatever original coding of the captured image values gets transformed by one or more functions Mgrad. E.g. R_mgrad=F1 (R_cap); G_mgrad=F2(G_cap); B_mgrad=F3(B_cap), and the YCbCr values corresponding to the RGB pixel color values can be calculated according to classical equations.

So what matters are the luminances of the master grading created for all image objects (we will first focus the explanation on this dominant aspect of HDR, namely the brightnesses, e.g. represented as luminances). This master graded video has an associated target display maximum luminance in this mere example being master grading maximum luminance ML_m taken to be 5000 nit. The light bulb exemplary luminances in those scene's images is not shown to keep the drawing manageable, but can be set e.g. to Lm_bu=4500 nit. The paper can in the master grading have an average pixel luminance of Lm_pw=150 nit, etc.

The next step is electing a master electro-optical transfer function for encoding those luminances (we started with luminances for clarity of explanation of the technical functioning) as actual pragmatically usable pixel color codes. Digital images to be compressed with e.g. MPEG-VVC typically desire YCbCr color coding, Y being a luma code, e.g. 10 bit, i.e. ranging between 0 and 1023 as largest possible code, and Cb and Cr being the chrominance components to give the achromatic pixel of a certain brightness a certain color (e.g. pastel green, a.k.a. "mint").

Typically one may use the perceptual quantizer (PQ) EOTF standardized in SMPTE 2084 for this mapping of master pixel luminances to corresponding master lumas (YM). The same happens to the chrominances, via a chrominance equation.

For the simplest HDR video communication systems, this is approximately all that is needed: one has specified an image with objects of various HDR luminance, and one has been able to code it as 10 bit YCbCr color codes.

More advanced future-proof HDR video codings will use more principles, inter alia, the actually communicated image (Im_c) need not be the same as the master image, in particular its communicated image maximum luminance (ML_com) need not be the same, and so all object luminances will also get different values (communicated luminances L_com) from the master luminances (L_m). For deeper details regarding a coding of applicant which can work specifically with 100 nit ML_com videos function as proxy to be communicated for the master grading images, we can (without wanting to suggest limitations on the below embodiments) point the reader to WO2017157977 (incorporated by reference). Examples of systems which use yet another kind of communicated image, which is not equal to a typical lowest dynamic range version of the original master grading, can be found in WO2016020189 (incorporated by reference).

As to the hardware technology (apparatuses), typically the camera is connected to a grading apparatus 202, comprising a circuit for doing the color processing for grading the master luminances and chrominance components, i.e. the master HDR image object colors as desired to make a beautiful HDR program. For an offline Hollywood movie, the color grader may spend several days to produce the master graded movie, and store it in some memory, for later distribution. E.g. he may be looking on one or more displays (2020, 2021), e.g. a HDR display for looking at the master HDR video images side by side with an SDR down-graded version on a legacy SDR monitor. User input means (2022) enabling the grader exactly how to change the colors (i.e. determine the shape of the grading function Mgrad or functions) may consist of e.g. a dedicated grading keyboard with trackball etc. Note that typically, even if only a single function is determined for mapping all possible input luminances (or corresponding lumas if the function is defined in the luma domain) to corresponding output luminances (or lumas), there will be a possibility to shape a differently shaped function for at least some of each temporally successive video image, since the optimal mapping will depend on the kind of scene (e.g. one may shoot a cave under a reasonably high amount of light, to not capture too much noise, but then grade it nicely dark in the master grading for the visual impact of the movie). Similarly, the luminance mapping functions FL_cod for making any secondary grading, like the one which in this example functions as proxy image for communicating the colors of the original master grading, may also change for several images of the video. If we are exemplifying this generic system for a real-life broadcast, e.g. of a sports event, there will typically be far less detailed grading involved. However a shader will still verify and accept at least a simple mapping function from the original capturing so that the HDR image doesn't look too bad. Typically a few dials may be involved for setting a midtone contrast, a black level, a soft-clipping behavior (knee) for the highlights, etc. In such situations the grading apparatus 202 may e.g. reside in a production van at the location of the shoot, or in a remote studio which receives the contributed original shoot material e.g. over the internet, etc.

When the master image (if those images per se are communicated) or the corresponding images to be communicated (Im_c) have been created to satisfaction, typical a distribution coder 203 will encode and compress them to any desired format, and format them for output over some video communication medium. In the simple elucidation we have shown e.g. the creation of an internet version of the video signal S1_inet(Im_c; MET), which can be e.g. HDR10+ or SLHDR−1 encoding. Suppose it is SLHDR_1 encoding. The so-called image essence, i.e. a pixelated image of e.g. 4000×2000 YCbCr color triplets, e.g. HEVC compressed, will be a 100 nit SDR image. The metadata will be firstly a different luminance mapping function (or actually SLHDR−1 applies various coarse and fine-tuning mapping functions to any image of any time instant of the video, but that is too deep a detail for the present elucidation) per video image, and on the other hand a specification of the needed chromatic color mapping for that image. The distribution coder can also make a secondary distribution version, which may be exactly the same SLHDR−1 signal, or in the example let's say it is a HLG image (second communicated image Im2_c, which will in the example have HLG OETF-defined lumas). In such case the second metadata MET2 is far less complicated, namely only a code specifying that the HLG OETF has been used for creating the second communicated image's YCbCr color codes. This constitutes on bird-eye level, and in general the encoding or transmission side system 200. The receiving side apparatus 240 can also have various actual embodiments, depending on whether it is e.g. in a cinema theatre, or in a consumer's room. Although some of the technical circuitry may reside in e.g. a settopbox or computer, let's assume for simplicity that the receiving side or end-user apparatus is a HDR television display. It typically has a receiver 250, capable of performing one or more HDR functions, typically of data management such as selecting from the signal the appropriate image essence and metadata etc., and send that to the color processing circuitry 251. It may ignore other metadata. Although in actual apparatuses some of the technical functions may be combined in a single dedicated ASIC or running on a general or special purpose processor (e.g. inside a mobile phone), we elucidate typical processing steps in the receiving side apparatus, which does the decoding of the received HDR signal, e.g. the broadcasted signal S2_bro(Im2_c; MET2), i.e. of the image essence which after parsing by the receiver is not only usually compressed, but also has the wrong absolute values or relative positions of the encoded luminances (or colors), on an axis which usually is at least not ending at the same maximum as the maximum luminance of the actually present end-user display (ML_ed). Although 3-dimensional processing may occur, typically the communicated lumas Yc as received, and the communicated chrominance components Ci, are processed in separate dedicated circuitry, namely luminance processing circuit 252 and color processing circuit 253. E.g., the luminance processing circuit will apply (depending on the type of HDR video definition and communication directly or after inverting) a mapping function for the image to be processed as received in the metadata (MET), to transform the communicated lumas into reconstructed lumas: YR=INV_FL_cod(Yc), for any Yc of any scanned pixel of the image being reconstructed in the decoding. That is shown in FIG. 2A to yield the reconstructed image (Recs). If the television is only capable of showing pixels as bright as up to 750 nit (i.e. end-user display maximum luminance ML_ed=750 nit), then of course a reconstructed image with pixels as bright as 5000 nit (the reconstructed image maximum luminance ML_rec) is still not directly displayable. Therefore display adaptation circuit 254 will apply a display adapted function FL_DAP, which may typically be a scaled-down version of the function FL_cod, to take into account the lower maximum luminance of this user's television, and it may also contain viewing environment adaptation. This processing guarantees one gets an image (the directly displayable display image Im_dis, which has all luminances at their correct final value and needs no further luminance mapping) which still reasonably maintains the creator's intent, i.e. how much brighter or darker any second image object should ideally be compared to a first image object, but given the unavoidable limitation of more limited maximum luminance of this display compared to this input image's target display maximum luminance. Finally a display formatting circuit 255 may perform conversion of the display adapted luminance to some format the display panel 260 needs (e.g. 8 bit RGBd codes, determined by final coding function RQ), and there may also be some post-adjustment involved to give the colors some flavor according to the television manufacturer (some user control settings such as a brightness increase for the darkest image pixels may be effectuated by the display adaptation circuit 254, but some may control the internal processing of the display formatting circuit 255.

FIG. 3 shows some aspects of the color processing involved in HDR image processing. If images where achromatic (a.k.a. black and white, i.e. colorless grey pixels only), HDR image processing, e.g. for coding, would already involve complex new insights. It is however the color processing that makes HDR most challenging. Human color vision is quite complex, due to many chemical processes in the cones of the eye and many neural processings (e.g. the color of a banana also depends on what the memory expects bananas to look like), so any color space with regular mathematical properties (e.g. colors of equal perceptual differences are ideally equidistant in the color space) one would like to design would be highly non-linear. However, to a fair first approximation, one can generate most colors by an additive combination of a red, green and blue primary, and roughly describe the visual appearance of a color as a hue, saturation, and brightness. However, even typical technical color spaces have non-linear behavior, making color processing non-trivial. One issue is that modified colors (which can be represented as an arrow from an input color to the resultant output color) can fall outside the gamut of representable colors of the representation (which in a coded-white-onto-max-displayable-white framework will also correspond to an undisplayable color). E.g., luma codes end at a certain number, e.g. power(2;10)−1, which we can call 100% or 1, and the code R=1050 can simply not exist. Just as that one cannot make more red than setting the backlight at maximum and opening the red channel at maximum. Secondly, the mathematical definition of the luma, which may be highly non-linear, creates complexity (and possible color errors as a result) even well inside the representable gamut.

HLG (standardized in ARIB STD-B67) at least handles the first problem. Since the apply the same transformation function on the three RGB color channels separately and identically, there is no out of gamut problem.

FIGS. 3A to 3C show the color errors that do happen. The color gamut is the RGB color cube, which is at least geometrically nicely easy. One can take the maximum color component (e.g. red component R, or green G, or blue B), to be 1.0. If one now defines a strictly increasing function F_mp which maps maximal input 1.0 onto output 1.0, this guarantees there will nowhere be an output above 1.0. Since this would be true for the three color components, the output color is guaranteed to always fall inside the gamut cube. We show however what would happen to a typical brightening function. Such a brightening function would come into play when mapping a higher dynamic range image to a lower dynamic range output image.

We can represent both images as a normalized color triplet, i.e. R<=1, G<=1, B<=1. However, for a 1000 nit image, the maximum normalized color (R=G=B) would correspond to 1000 nit, whereas for a 100 nit image, that same normalized color would represent a white which is only 100 nit. Suppose we want to define some dark grey color, in the HDR image. In a linear RGB representation we could e.g. say that R=G=B=1/100. That would define a 10 nit grey pixel, in the HDR representation. If one were to use this representation as an SDR representation (e.g. directly display the coded colors, without appropriate brightness processing), on a 100 nit display the 100 darker color would appear as 1 nit, i.e. dark black rather than dark grey. So, before displaying, one would make a suitable SDR image from the HDR image, which at least boosts the darkest colors (e.g., if not by 10×, then e.g. by 5×). One cannot boost the brightest colors, since they must end at the displayable (or representable in the SDR image) SDR maximum (1.0 representing 100 nit). Ergo, one typically applies a brightening curve of the convex shape as F_mp in FIG. 3B shows (a so-called "r-curve"). The action of the curve is shown as a squeezing towards 1.0 of originally equidistant colors in FIG. 3A, e.g. arrow 301 maps an originally darker input color (or more precisely its red component) to the output value shown by the circle at the end of the arrow. An r-curve relatively brightens the darker colors, by having a slope larger than 1.0 at the dark end.

Achromatic (a.k.a. colorless) colors are defined by the property of always having their three color components equal (R=G=B), whatever their brightness (e.g. R=0.2). So applying the same curve to the color components separately will yield indeed a nicely brighter still achromatic color. A color with a certain hue and saturation (e.g. pale red, a.k.a. pink) will be defined by the ratio of the color components (e.g., the color is strongly red if there is much more red component than blue and green in the mixture). This additive composition is shown in FIG. 3C. Suppose the input color (resultant color RC_1) is composed of a little bit of red (normalized value R_1), and lots of green (G_1). Perceptually (i.e. when the system is technically used under typical scenario of e.g. surround illumination as expected) this would give a yellowish green. If we now apply the function F_mp, it is mostly the red component that will grow (e.g. double in magnitude) because the green component is near 1.0, and cannot change much percentually anymore. Ergo, in the output additive mixture, there will be a predominance of the red component. In fact, the two components are almost equal, which would give a yellow color (second resultant color RC_2) instead of a certain green. In general, the saturation and the hue (and even the intended brightness if not handled correctly) may be incorrect for such independent-channel processing, for substantially all colors in the gamut, and this may be objectionable. It may be a simple manner of creating and handling HDR, but future-oriented it may not by everybody be considered to be a high quality HDR system.

In FIG. 3D we show how alternative systems can handle the colorimetry. The future-oriented systems, that handled HDR more accurately (e.g. SL-HDR), also decided to use that color definition and processing.

Here we show a more realistic representation of an additive gamut (and more perception-oriented). It is shown in a partially cylindrical hue/saturation/brightness view (but in practice may also be handled in a diamond-shaped version, e.g. by using the chrominances CbCr which for a given object saturation increase with increasing luminance, as shown in FIG. 3E, where we have shown a slice through the gamut spanned by the blue chrominance, and a luma Y_n, e.g. PQ-defined lumas, to represent the normalized luminances).

The vertical axis represents the brightness of any pixel, specified as a normalized luminance (L_n). We can again represent any actual gamut (which is just a multiplication-scaled version given the same RGB primaries define the same shape), ending at e.g. as shown a maximum target display luminance of 5000 nit, in the normalized version. So if we overlap the gamuts of e.g. a 5000 target display input video and a 100 nit output video, we can show the HDR-to-SDR luminance processing as an arrow which moves the relatively dimmer colors of the HDR image, to corresponding relatively brighter colors of the SDR image. On the horizontal direction is the saturation S, the zero saturation occurring in the middle, for the achromatic colors, which span the luminance axis. So we can again take a dark grey color (C_Ha), of the HDR image, and brighten it (with the same function F_mp, or another convex function), to obtain the relatively brighter corresponding SDR color C_Sa. If we again take a function which maps 1.0 onto 1.0, no color on the achromatic axis will go beyond the maximum white of the color representation L_n=1.0). However, this color space is not a cylinder, with all maximum colors (for any color of saturation e.g. S=0.5 and some hue angle defining a slice of different orientation through the cylinder) falling at an equally high normalized luminance, i.e. L_n equal to 1.0. White is the brightest color, defined by setting all color components to the maximum. To create any other color, one must remove some energy of at least one of the components (i.e. lower its value). E.g., maximal yellow (Ye) can occur by removing all blue. Because of the chemistry of the eye, blue looks darker than e.g. green, i.e. it has a low own luminance. This means one would not remove much luminance to create maximum yellow (the exact amount depending on which chromaticities one chose for the primaries, e.g. Rec. 709 versus Rec. 2020 primaries), say e.g. 10%. But it also means that the brightest saturated blue (FIG. 3D, B) one can make, would only be 10% as bright as white. So we get a very asymmetric gamut top. Ergo, applying the same mapping curve (same shift, or at least same multiplicative shift) to a blue color (i.e. in a luma-chroma separated processing as shown in FIG. 2 based on the luminance of the blue only, a high luminance blue already lying close to the upper gamut border) will make HDR blue (C_Hb) map to an SDR blue (C_Sb) which falls out of gamut. What happens in practice then is that the blue component would clip to its maximum, so become less dominant in a mixture, i.e. we can also get a resultant color Cr which has the wrong hue, saturation, and brightness. But this would only occur for some "difficult" colors, as we could control most well-inside-gamut colors to yield exactly the output as desired, typically a color which is only relatively brightened, but maintains the same hue and saturation as the input color (unlike with the HLG mapping).

EP3537697 teaches how one can bring Hybrid-Log-gamma defined HDR images into an absolute framework, involving a variable luminance mapping function shape which can be optimized for a scene, by focusing on where the halfway point between the square root and logarithmic part of the HLG luma range will map in the luminance range.

US2021/0272497 teaches that color processing for display-adaptive high dynamic range image optimization may need several control luminance values for luminance-dependent saturation changes.

US2019/0206360 handles the non-constant luminance problem of highly non-linear EOTFs, when the chroma component pixel images are spatially subsampled. A more correct value for the luma is derived, e.g. by binary search.

US2021/0241055 teaches how one can print HDR images. The dynamic range of even the best quality prints is much lower than the dynamic range of video images even of moderate maximum luminance (e.g. 1000 nit), inter alia because prints cannot make luminous regions because they cannot go brighter than paper white, and also they cannot make deep blacks because inks (especially when spread not too thick) are not perfect absorbers. Therefore significant dynamic range down-conversion is needed to make an SDR image for printing which corresponds to the HDR image. Embodiments can focus on what exactly is in the image, e.g. if there are mostly ultrabright pixels, one can map those to a large sub-range of the printable range, by making the mapping function substantially equal to zero for hardly existing dark and medium brightness pixels in such an image.

So, in a spirit similar to the calculation simplicity of HLG, it is desired to have a relatively simple mechanism to elegantly handle out of gamut issues of HDR image luma or luminance transformation of the luminance/chrominance processing type.

SUMMARY OF THE INVENTION

The desired advantage is realized by a method of transforming an input pixel color (C_Hb) of a high dynamic range input image into an output color (C_Sb) of an output image, wherein the input color is represented as a gamma-log-defined triplet comprising an initial first color component, an initial second color component and an initial third color component according to an opto-electronic transfer function which has a gamma-log shape, wherein the initial first, second and third color component are transformed into an intermediate red color component (R"_im), an intermediate green color component (G"_im) and an intermediate blue color component (B"_im) by mapping the initial color components with a function which is the same for each color component, wherein the function has a slope larger than 1 for a sub-range comprising the darkest color component values of the initial color components, characterized in that the intermediate color components are transformed into a corresponding red output color component (R"_out), green output color component (G"_out), and blue output color component (B"_out) by applying:

calculating a first value (Mx) which is for each input color the largest one of the three intermediate color components;

subtracting from the first value a second value which is equal to a value obtained from applying the opto-electronic transfer function to a tertiary value, which tertiary value is equal to a target display maximum luminance for the output image (ML_To) divided by a maximum luminance associated with the opto-electronic transfer function (ML_PQ), which subtraction yields a fourth value;

calculating a fifth value by determining the highest one of the fourth value and zero;

calculating the three output color components by subtracting the fifth value from the corresponding intermediate color component, and setting the output color component equal to zero if the subtraction yields a negative value.

The problem occurs with so-called "low luminance colors", i.e. colors that typically look darker to human vision. That would be colors like blue, foremost, red, and often also magenta (in contrast with colors like green, and yellow, which by looking bright have a local gamut maximum luminance which is close to the white point tip, and will normally not be the colors which create out of gamut projection). The alternative to the proposed per pixel corrective processing, to bring the output pixel back into the gamut, at least on the boundary of the gamut, would be to check the luma-mapped image for problem areas, and then process it again with an r-curve which has a shallower slope for the sub-range of the darkest colors, i.e. the "blacks" and "dark greys" and "dark colors". Although that would create no or at least less out of gamut colors, the whole output image would look considerably less brightened, i.e. its dark regions may now look non-ideal dark again. So we would like some processing which can work based on the luma mapping as desired, processing substantially only the problematic out of gamut pixels, whilst leaving the other calculated output image colors, which are okay, substantially unchanged.

The inventors also found that such low luminance colors often happen for graphical material, be it computer generated and inserted, or already in the camera-captured scene such as e.g. a printed cloth with a red or purple company logo on it. If such an image area would consist of a single color, that may for a consumer be unproblematic. But typically there will be a color shift (hue and/or saturation) involved, and an incorrect color for a trademark may be problematic for the company who paid for the commercial (they would rather have a somewhat dimmed brightness version, but at least of the correct e.g. Ferrari red). If the object color is lit with different amounts of lighting and shadowing, i.e. e.g. the same rose petal red but of different luminance, then the output result may show quite different hues for that object, e.g. in addition to reds some purple pixels, because a blue color component has increased due to the transformation whilst the red component has clipped. That may be undesirable even for uncritical consumers.

The invention makes use of an advantageous property of gamma-log OETF defined colors. The skilled person understands what this means. E.g. a luma code is defined by applying an OETF to the luminance. E.g.:

$$\text{Luma} = 1023 * \text{OETF\_gammalog(normalized luminance)} \qquad \text{[Eq. 1]}$$

The normalized luminance is obtained by dividing a pixel luminance by a reference maximum luminance, e.g. 10,000 nit. Non-linear additive color components are calculated on the basis of the linear R, G and B components in the additive mix, by using the same OETF, e.g. R"_norm-OETF (R_norm), wherein R"_norm and R_norm are both normalized to a maximum of 1.0, and can be converted to absolute values by using a scale factor. E.g. an 8 bit non-linear component can be calculated as: R"_abs=255*R"_norm. The normalized linear components are obtained by dividing by the reference maximum, e.g. a contribution of 3500 of red would yield R_norm=3500/10,000=0.35.

A gamma_log function is a function which starts out as a power law for the darkest colors, i.e. Luma_norm=power (L_norm; p) if L_norm<k, with k<<1. And it becomes logarithmically shaped above the threshold k. E.g., a popular gamma-log OETF, with which the input colors are usually already defined, is the Perceptual Quantizer OETF, which becomes logarithmic above approximately 20 nit, so well-situated for enabling our below out of gamut processing embodiments. Another exemplary gamma-log OETF is applicant's version described in WO2015007505, herewith incorporated by reference. A logarithmic subtraction behaves in the corresponding linear world as a scaling, which corresponds to a dimming usually without change in hue or saturation.

The input color triplet (first, second and third color component) may be either already in gamma-log defined R", G" and B" (we use the double dash notation to indicate that the color components are not linear, in similarity with the single dash—R'—being used to define approximately square root non-linear components as standardized in Rec. 709), or in YCbCr format. The skilled person knows the standard matrixing equation with matrix M to convert between the two systems if necessary.

$$Y = a*R'' + b*G'' + c*B''; \qquad \text{[Eqs. 2]}$$

$$Cb = d*(B'' - Y);$$

$$Cr = d*(R'' - Y);$$

The constants a, b, c, d, and e which define the YCbCr model depend on the chromaticities of the elected primaries, i.e. Rec. 2020, or DCI-P3, and that is standard colorimetry, which also does not relate to the novel insights of the present innovation (which must work for any primaries, luminance mapping function, etc.), so we do not expound details further. We will assume that we can transform the input color, into some intermediate color (R"_im, G"_im, B"_im), which would be good for the output image (e.g. an SDR image derived for the input master HDR image), except for where it projects outside the gamut. The skilled person understands that inside the circuitry, or calculations, one can temporarily make the color representation larger (e.g. the output of color transformation circuit 501), so that it can run till e.g. 5.0, as long as the final output colors are within gamut, i.e. R"_out<=1; G"_out<=1; B"_out<=1. Also, we want to have positive or at least zero color components. We elucidate one example where the processing happens on the R,G,B components, non-limitedly, since similar processing can be done on the corresponding gamma-log-ed YCbCr color components. The brightening of the transformation happens by e.g. applying an r-curve with a slope for the darkest colors (e.g. the 20% darkest colors, Y<0.2) which is higher than 1.0 or 45 degrees.

An example of a useful embodiment of such a curve is taught in WO2017102606, incorporated by reference. It is a curve which, in gamma-log luma space (i.e. the luminances are being processed in their corresponding luma domain) starts with a configurable linear segment below a first input value threshold Y_in_1, the configuration can consist of the threshold position and the slope, followed by a parabolic part up to a second input value threshold Y_in_2, which may usually fall below 1.0, and another configurable linear segment for the brightest colors up to maximum white. Note that these are just exemplary luma mapping functions for easy elucidation, and in general any increasing function shape may be used (even in certain embodiments with equal output value for different input values, e.g. a luma clipping). The function may in practical embodiments in actuality be applied to the three color components by multiplying by a common multiplier (mLum). In principle any such mapping can benefit from the present innovative improvement approach.

The maximum Mx of the pixel colors minus the OETF (ML_T_o) value calculates how high above the upper gamut boundary the projection is. The first maximizer avoids negative values, by making the result at least as large as zero. This amount is subtracted from the intermediate color components resulting from the (uncorrected) desired luminance processing, performed by color transformation circuit 501. Oftentimes all components are high enough so that the color merely shifts hue-preserving onto the upper gamut boundary. Therefore all the red colors of a glowing image of e.g. a rose will all stay red (there may be some loss of detail inside the rose because all differential luminance has been lost due to simple mapping of all those colors onto the same chromaticity (hue and saturation) location of the upper gamut boundary, but at least the problem of different hues, like purples appearing inside red objects, is elegantly avoided. Sometimes one of the color components would dive below zero due to the subtraction. Third maximization circuit (557), fourth maximization circuit (558) and fifth maximization circuit (559) would ensure all color components of the output color are positive (the x in FIGS. 5 and 6 indicates whichever component value is input, e.g. R"_im minus VF). The value of the target display maximum luminance may usually be that of the display which is connected to the IC or apparatus (e.g. a Set-top-box or computer, etc.) doing the processing, or of the television or display itself in case the processing happens in such an apparatus. It may also be a preparative value for later watching of prepared and stored videos. This can be used in scenarios where a few videos of different maximum luminance are stored (after pre-optimization according to the present method) for e.g. video on demand. To be overcomplete, the wording "target" does not refer to the situation as is (i.e. the maximum luminance of the input image), but of the optimized output image to create.

FIG. 4 aids for understanding as it shows another manner of looking at the luminance/chromaticity-based color gamuts of FIG. 3D.

Now all possible gamuts, e.g. of a HDR image to be optimized for a target display of 650 nit, which corresponds to an actually available television, are superimposed on a primary gamut, in a scaled manner. The normalized luminances L_nPQ, of this e.g. perceptual quantizer color gamut, still end at 1.0. But the absolute luminance corresponding to this relative maximum is a maximum luminance associated with the opto-electronic transfer function (ML_PQ), which for PQ is by definition 10,000 nit (for Philips' primary OETF it is typically 5000 nit). How high any gamut goes, depends on the elected target display's maximum luminance. E.g. if a video needs to be made for ML_T is 2000 nit (e.g. starting from a 5000 nit master grading, which would again need r-type luminance down-grading, or relative upmapping), the maximum would fall on the PQ luma which corresponds to normalized luminance 0.2 (2000/10,000), which is calculated by using the PQ OETF. There may be a similar situation of out of gamut mapping, if something maps beyond the intended output image gamut, in the example the 2000 nit target display gamut, as shown. Absolute luminance EOTFs associate (as defined in the corresponding standard defining the EOTF) some maximum luminance value with their maximum luma code (e.g. 1023 in 10 bit). Some EOTFs may use a variable (configurable) maximum luminance, but e.g. perceptual quantizer uses a fixed value of 10,000 nit.

It is advantageous if the method of transforming an input pixel color calculates an aggregate fifth value which is obtained as the maximum one of successively calculated fifth values for a set of pixels of the input image. The method mentioned here before is extremely simple as it can be calculated per pixel, on a run of successive pixels, e.g. coming from a zigzag scan of the input image. One only needs to determine properties based on the colorimetry of the pixel being currently processed, ergo, many actual calculation schemes can be designed, e.g. for an ASIC or algorithm running on a CPU or GPU. A disadvantage of the simple version is that all out of gamut pixels of the same chromaticity are projected onto the same upper gamut boundary point, ergo, some internal detail is lost. That may not be problematic for e.g. bright logos consisting of only a few consistently presented colors, such as e.g. a logo of a television station in the top left corner of the image, which consists of e.g. single color red text on a yellow background. One will only see a slightly dimmer version of the same color. It may also work on such objects in the image like e.g. a red TL tube. But some objects, like e.g. sunlit clouds, which have a critical bright HDR pixel composition may fair less favorable. There are a couple of alternatives, namely to do a better version, or to switch the processing off and potentially do another out of gamut handling strategy. This embodiment allows to collect the fifth value for a number of pixels in a definable area (e.g. the rectangle covering the top-left logo), and select the maximum value of the fifth value for all the pixels in the rectangle. This allows for more differential color structure in the back to gamut mapped output colors. One has to delay the pixel processing pipeline until the aggregate final value to be used for all or some pixels in an area of the image is to be applied on the pixel scan. This can be realized in various manners, e.g. two passes through the entire image (one for determining the fifth values, and one for applying them to create in-gamut output colors), a smaller partial memory and separate dedicated scan of the rectangle thereafter continuing the normal scan of the remainder of the image, maintaining a pixel mask to decide on which pixels to apply the single fifth value depending on the pixel's own color (i.e. the color of the pixel before it gets mapped to the gamut) versus the aggregated fifth value for other pixels, or even no processing, etc., depending on whether a hardware circuit for an ASIC is designed, or software for running on a mobile phone, etc.

It is advantageous if the method of transforming an input pixel color comprises a color detail analyzer 640, arranged to determine a detail measure (DM) for a pixel to be transformed, and applying the transformation if the detail measure is smaller than a threshold (ThM). One can design more complicated detail analyzers, but in general a simple one would do. The purpose is to check whether the present method, in particular with the single own-color determined fifth value, would create (really) objectionable results, in the sense that they would e.g. be worse than doing nothing. Or, in some scenarios one may decide to use a highly advanced out-of-gamut handling, e.g. a strategy that is optimized by a human color grader, and co-communicated, but one would do that only on regions which really need careful optimization of the out of gamut compensation, e.g. balancing between brightness and saturation deviations and maybe even some slight hue errors, such as e.g. for a sunlit cloudscape. But one would not like to both the human grader when the simple algorithm could work automatically just fine. This method may e.g. be run on the creation (encoding) side, to show where it would go wrong on the decoding side, so that the video creator can take action. He can then e.g. define a secondary area in the image (e.g. as a pixel mask, or rectangle, etc.) where his advanced processing would be applied. On the other hand the detail analyzer can also work only at the receiving side, in the image processing apparatus being e.g. a consumer television, to decide whether or what post-correction should be done. An example of a detail analyzer would see that there are e.g. two color lobes in the color histogram, around which a few variant colors with small color difference (e.g. delta-brightness, or delta-saturation) are spread. This would constitute a typical from practice two dominant colors situation, like exemplified with the red on yellow logo example. In such a scenario one may well apply the simple algorithm with the per pixel own-color-dependent fifth values. If one sees many yellow and pinkish colors of the sunset cloudscape, one would not like to apply that method, and do something else. So a simple details measure can be the amount of colors, e.g. calculated as a largest deviation from a mean color and the like. The creator of the algorithm can determine a threshold ThM from e.g. studying a number of typical images on which he would except the algorithm needing to kick in (e.g. discotheque images need to be brightened so that one can-albeit blackish-still see somewhat of the dancing people, yet all the often monochromatic light sources like flashlights and lasers should undergo out of gamut correction, and one can put some of those images in the test set to see how the system behaves on average). E.g. if the blue lasers stay with a color difference (taken as threshold) of delta_Lab of e.g. 10 (or a YCbCr-based error), one can apply the simple method. Advanced details analyzers may e.g. use trained neural networks, but that necessitates more chip surface and power at least for training in general.

It is furthermore advantageous to realize practical variants as e.g. an apparatus (500) for transforming an input pixel color (C_Hb) of a high dynamic range input image into an output color (C_Sb) of an output image, wherein the input color is represented as a gamma-log-defined triplet comprising an initial first color component, an initial second color component and an initial third color component according to an opto-electronic transfer function which has a gamma-log shape, wherein the apparatus comprises a color transformation circuit (501) arranged to transform the initial first, second and third color component into an intermediate red color component (R"_im), an intermediate green color component (G"_im) and an intermediate blue color component (B"_im) by mapping the initial color components with a function which is the same for each color component, wherein the function has a slope larger than 1 for a sub-range comprising the darkest color component values of the initial color components, characterized in that the apparatus comprises:

- a first maximization circuit (551) arranged to calculate a first value (Mx) which is for each input color the largest one of the three intermediate color components;
- a first subtractor (552) arranged to subtract from the first value a second value (V2) which is equal to a value obtained from applying the opto-electronic transfer function to a tertiary value, which tertiary value is equal to a target display maximum luminance for the output image (ML_To) divided by a maximum luminance associated with the opto-electronic transfer function (ML_PQ), which subtraction yields a fourth value (V4);
- a second maximization circuit (553) arranged to calculate a fifth value which is the highest one of the fourth value and zero;
- a second subtractor (554), a third subtractor (555) and a fourth subtractor (556) arranged to calculate three output color components (R"_out, G"_out, B"_out) by subtracting the fifth value from the corresponding intermediate color component, and arranged to set the output color component equal to zero if the subtraction yields a negative value.

Or, the apparatus (500) for transforming an input pixel color (C_Hb) of a high dynamic range input image as claimed in claim 4, comprising a sixth maximization circuit (665) arranged to yield an aggregate fifth value (VF) which is obtained as the maximum one of successively calculated fifth values for a set of pixels of the input image.

Or, the apparatus (500) for transforming an input pixel color (C_Hb) of a high dynamic range input image as claimed in claim 5 or 6 comprising a color detail analyzer circuit (640) arranged to determine an amount of color detail, and therefrom a control signal (CTRL) controlling whether to apply the processing starting with the calculation of the first value, or yield as alternative output color components (R"_out2, G"_out2, B"_out2) the intermediate color components, for at least a region of the input image.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions.

In the drawings.

DETAILED DESCRIPTION OF THE EMBODIMENTS

Figure 5:
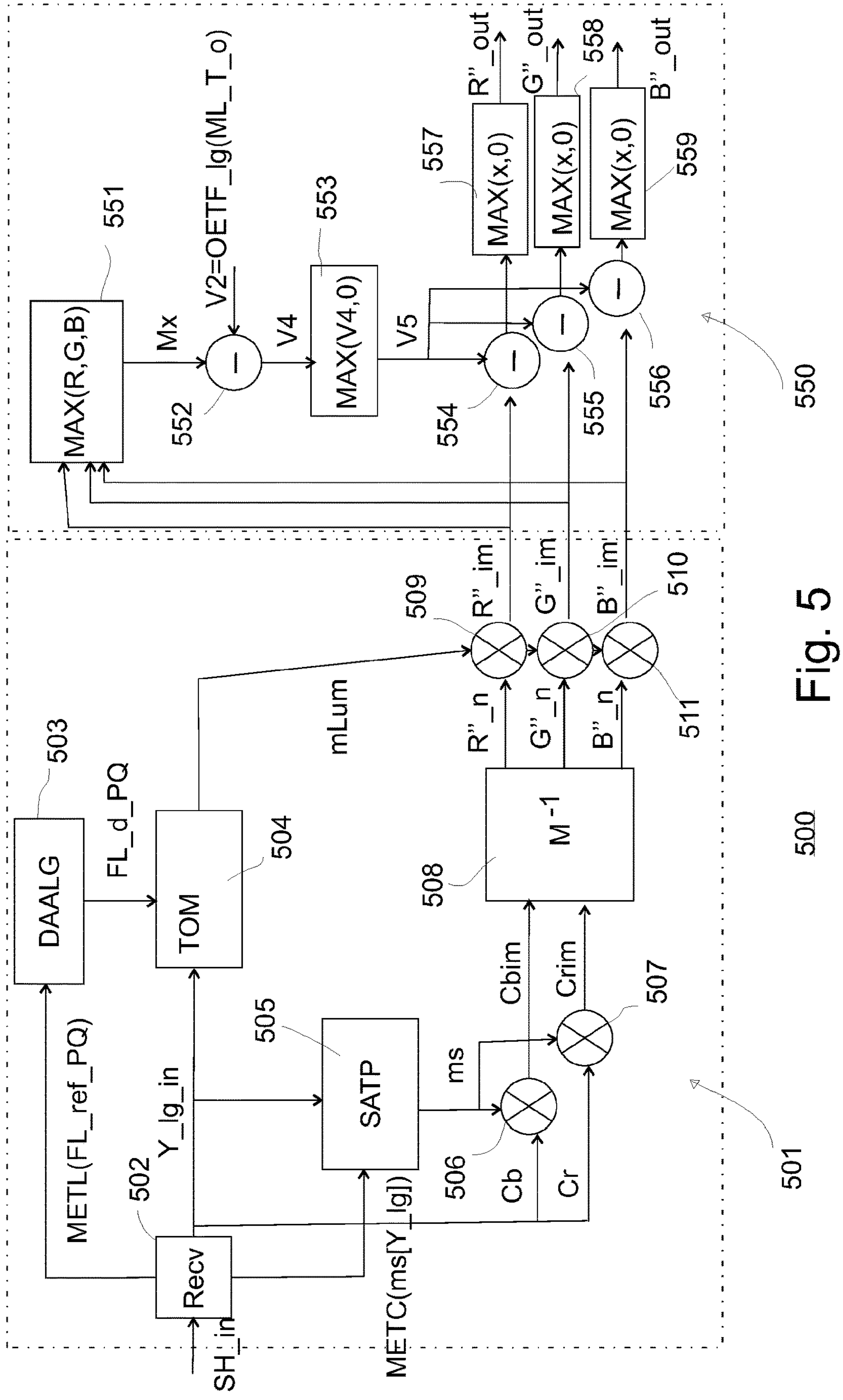
FIG. 5 schematically illustrates a basic configuration of sub-circuits of an apparatus for doing a simple embodiment of the present innovation.

FIG. 5 shows a mere example for elucidation, without desire to be needlessly limited, of typical components that may be present in some receiving side apparatus, which is to receive and process (e.g. for display) a HDR video, e.g. a sports broadcast or TV show (or movie etc.). Without wanting to be limiting, we will assume we describe a consumer television, which receives PQ-defined YCbCr pixel colors in the input image, and keeps working internally in the PQ domain (indicated by the double dash"). The left sub-circuit is the color transformation circuit 501. Because our innovation should work with many such embodiments, we will describe it as shortly as necessary.

Figures 1, 1A, 1B:
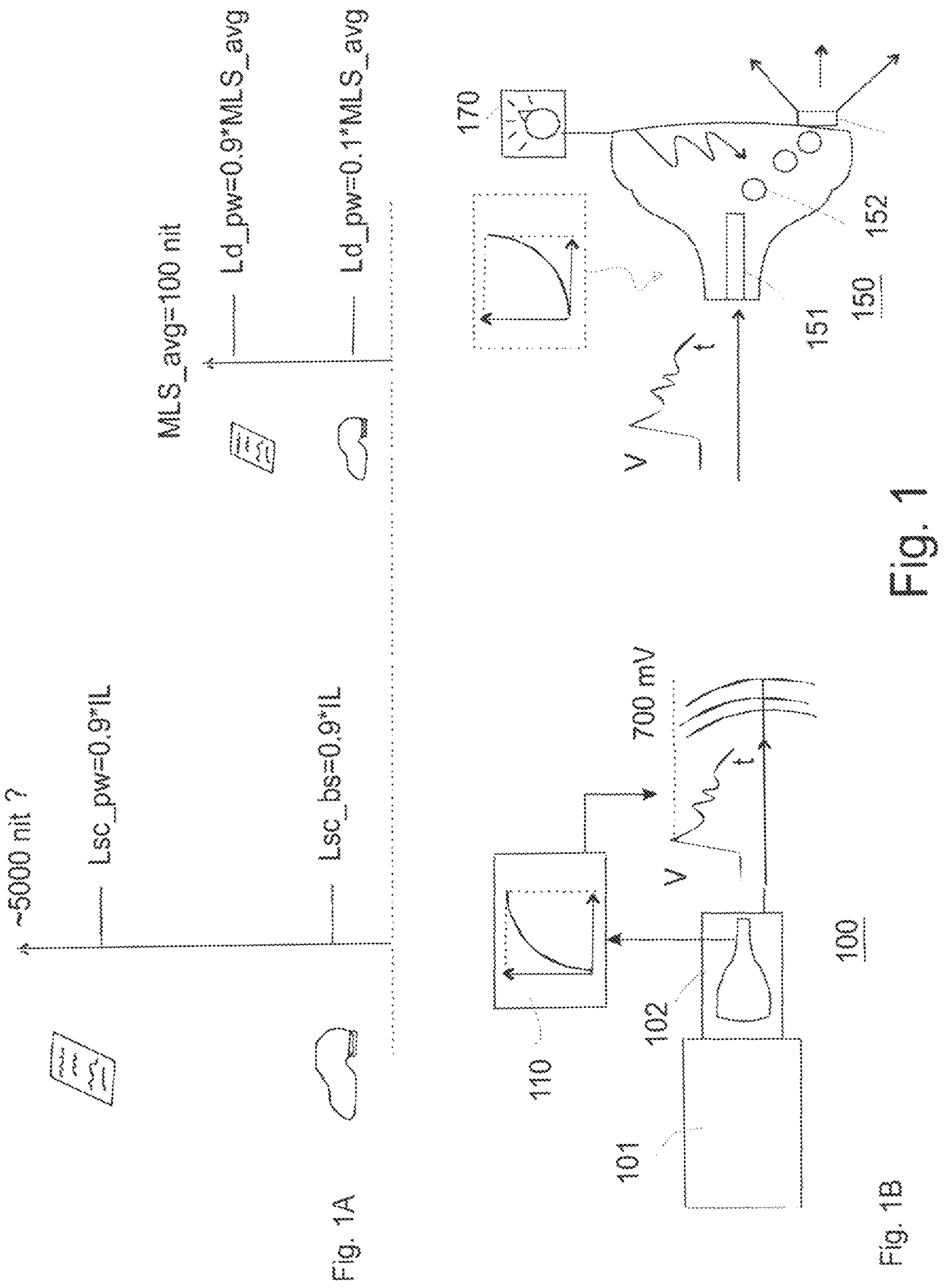
FIG. 1 schematically illustrates as a technical background reference the classical so-called low dynamic range or standard dynamic range (SDR) video handling (creation, coding and communication and display), which at this moment is still the dominant approach to video in the market (i.e. it is "normal video technology"), but is rapidly being displaced by High Dynamic Range (HDR) video technology.
Figures 2, 2A, 2B:
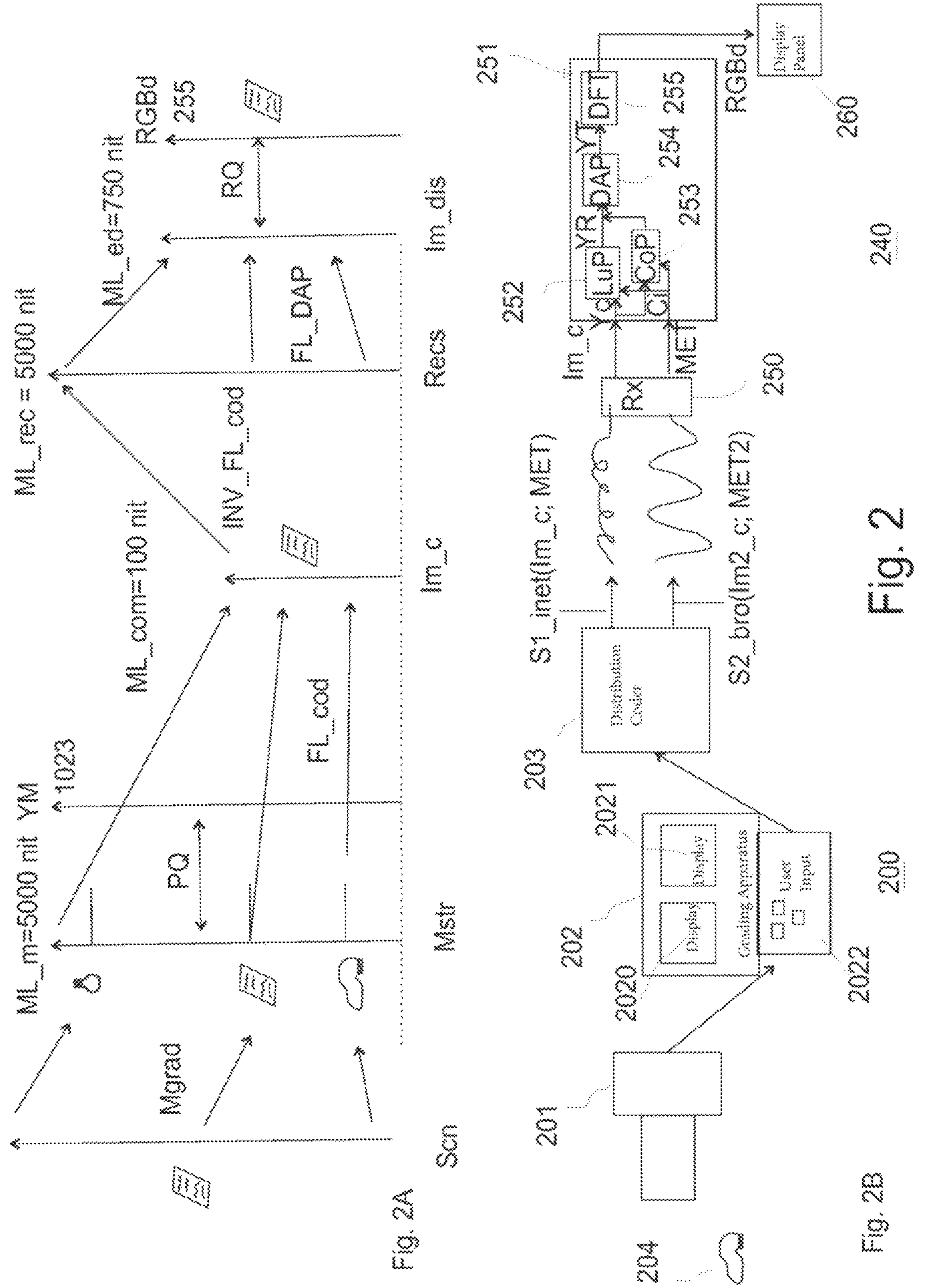
FIG. 2 schematically illustrates on a bird-eye summarization level typical aspects of modern and future-prove HDR video handling from creation of new HDR looks to optimal displays on a spectrum of variable maximum luminance capability end user displays.
Figures 3, 3A, 3B, 3C, 3D, 3E:
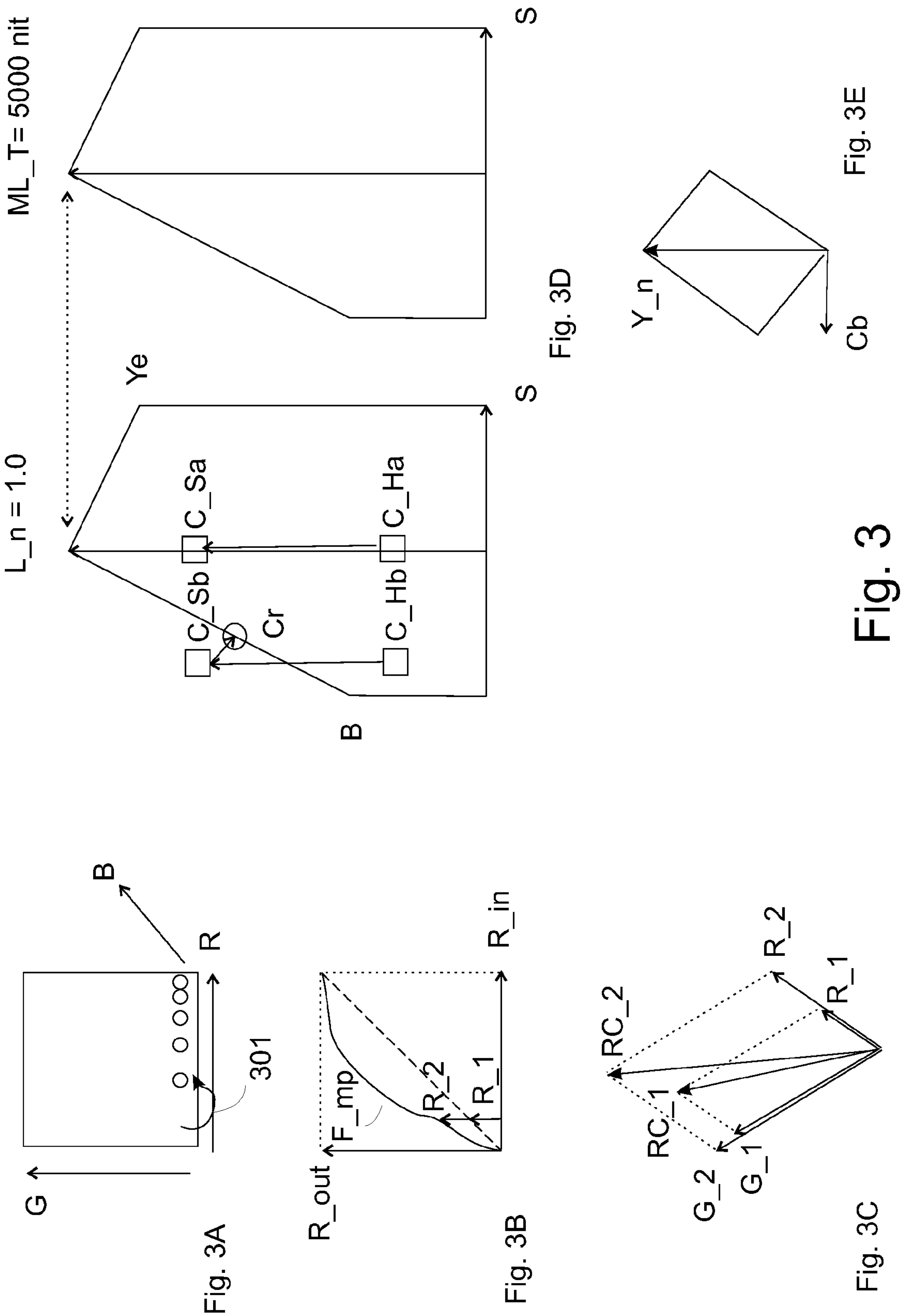
FIG. 3 schematically illustrates two alternative manners of color processing, i.e. the 3 color dimensions, i.e. in addition to the achromatic axis of brightness two additional colorful dimensions, which can be used for HDR image processing (note that e.g. image brightening on a color image is at the end of the day a 3D color processing, even if it is primarily defined by a 1D brightness processing desideratum, e.g. a luminance mapping function)
Figure 4:
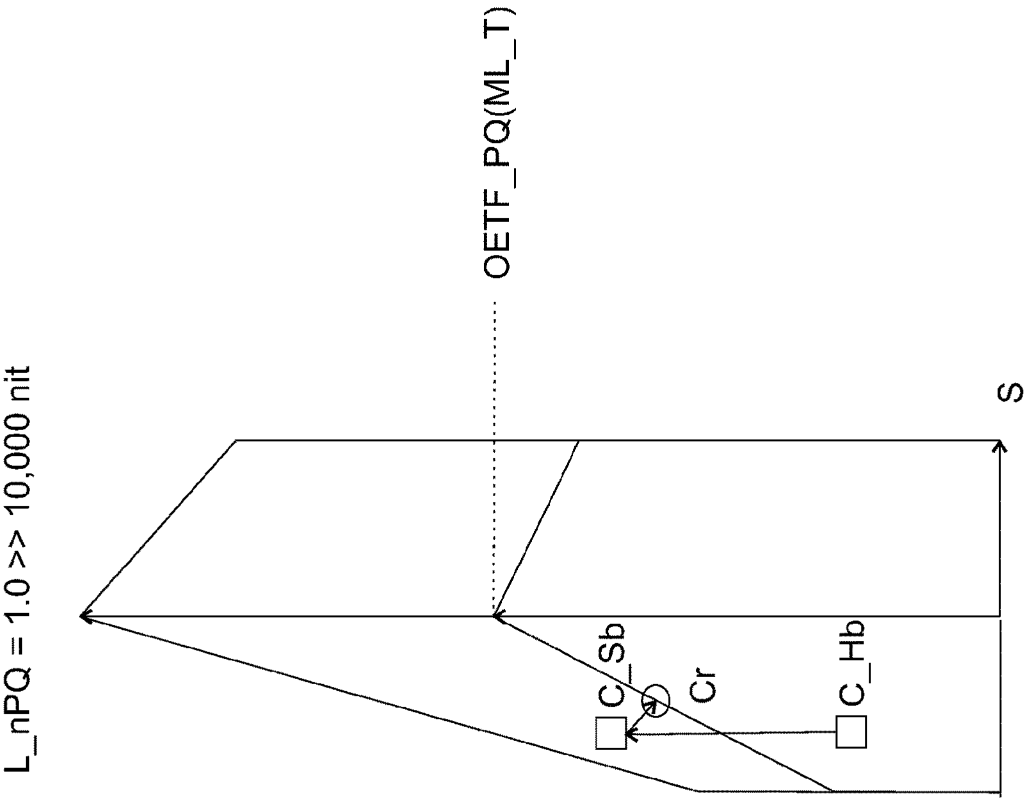
FIG. 4 schematically illustrates luminance processing for HDR images having different associated maximum luminances, and corresponding re-grading of at least one pixel color (e.g. a relative brightening, to make the actual (absolute) displayed pixel come out the same luminance irrespective of which image variant is used for driving the display)

In many practical embodiments (although the innovation may be applied in e.g. an apparatus which receives or determines its luminance mapping function differently) a receiver 502 is configured to parse (extract and distribute to the appropriate calculation circuitry, and sometimes correctly configure such circuitry, e.g. creating a LUT, although that may also be performed internally in the calculation circuit) typically a broadcasted or dedicatedly transmitted HDR video signal (SH_in). As explained with aid of FIG. 2, that will typically contain an image essence, i.e. a pixel matrix of YCbCr colors, which will be scanned sequentially to be color processed one by one, and also metadata. Metadata can have various flavors depending on the HDR standard, but without limitation we will assume a SL-HDR-type metadata, which comprises e.g. one dedicated (optimal) luminance mapping function for each time-sequential image, which is in the luminance part of the metadata METL. We assume without limitation it is defined in the PQ domain, i.e. FL_ref_PQ. Another piece of metadata for one or more images is a color metadata METC, which comprises e.g. a lookup table of chrominance multipliers for all possible gamma-log luma values (ms[Y_lg]). A saturation handling circuit 505 will, based on the actual luma of the currently being processed pixel (Y_lg_in) select from the saturation multiplier LUT the corresponding multiplier. The two chrominance components Cb, Cr of the current pixel will be multiplied by that selected multiplier ms, which constitutes the color processing, yielding "output chrominances", at least for the moment, namely intermediate chrominances Chim and Crim. Via a matrixing circuit 508 normalized versions of the gamma-log-defined red, green and blue color component are calculated. This inverse RGB-YCbCr equation is well-known to the skilled person, so not further explained (see above eqs. 2). These normalized components will be scaled to their correct amplitude (by first, second and third re-scaling multiplier 509, 510, 511), after the luminance processing upper track has performed its desired calculations. The reference luma mapping function FL_ref_PQ extracted from the HDR input signal metadata is typically a mapping function from the HDR input to an SDR 100 nit signal. So if 100 nit maximum luminance output is desired it can be directly used in the luma mapper 504, but otherwise (if e.g. an optimal image for a 350 nit display should be calculated from an input 1000 nit image) an adapted function should be calculated (FL_d_PQ). Again various display optimization algorithms may be used, e.g. also taking into account needed optimization for an atypical viewing surround. So for the present elucidation of the actual components of the innovation (which reside in back to gamut mapping sub-circuit 550) it suffices to say that display adaptation function calculation circuit 503 calculates a somewhat dimmed-down version of FL_ref_PQ, which has been compressed towards the diagonal of the plot of normalized to 1.0 input and output lumas. For more details of possible technical approaches the interested reader is pointed to WO2017108906. For elucidation of the present invention even a suboptimal display adaptation which merely creates a function FL_d_PQ which has half the orthogonal distances from any point on the diagonal compared to FL_ref_PQ will do: it may not yield the perfect colors inside the gamut, but the out of gamut correction will kick in anyway.

The luma mapper applies the function: luma_out=FL_d_PQ(Y_lg_in). In addition in this example, it converts the result into a multiplier mLum, which will yield the same result as applying the function, when multiplying the normalized RGB components R"_n, G"_n and B"_n each by that same multiplier mLum, yielding the color processed intermediate color components R"_im, G"_im and B"_im.

How this can be realized goes as follows. Suppose we brighten a value V_in to become V_out=F(V_in). Say the brightness boost (mLum) is 2×V_in. This mLum can then be found as V_out/V−in=F(V_in)/V_in. So the luma mapping circuit knows its input, and merely needs to divide the output of the function by its input, to get as output the desired multiplier mLum.

Continuing now to a typical embodiment for the simple out of gamut processing (or to gamut projection), we first determine in first maximization circuit (551) which of the three input color components is the highest one (in extended range internal representation for calculating which can go above 1.0). E.g. if the intermediate color was R=0.9; G=0.1;

B=1.2 then Mx will be 1.2 (the blue component). If we need an output image for say a 350 nit display, we calculate V2=OETF_PQ(350/10,000) or in general OETF_lg(0.035) in case we have a different gamma-log OETF. Subtracter 552 subtracts V2 from Mx.

Second maximization circuit (553) makes sure only out of gamut colors are downmapped. Second subtractor (554), a third subtractor (555) and a fourth subtractor (556) subtract this necessary towards gamut projection from the intermediate color components of which at least one was too high. It can happen that one of the color components, in the above example possibly the green one which was as small as 0.1, goes below zero. In order to maintain positive output color components (R"_out, G"_out, B"_out), third maximization circuit (557), fourth maximization circuit (558) and fifth maximization circuit (559) will make any negative value equal to zero.

Figure 6:
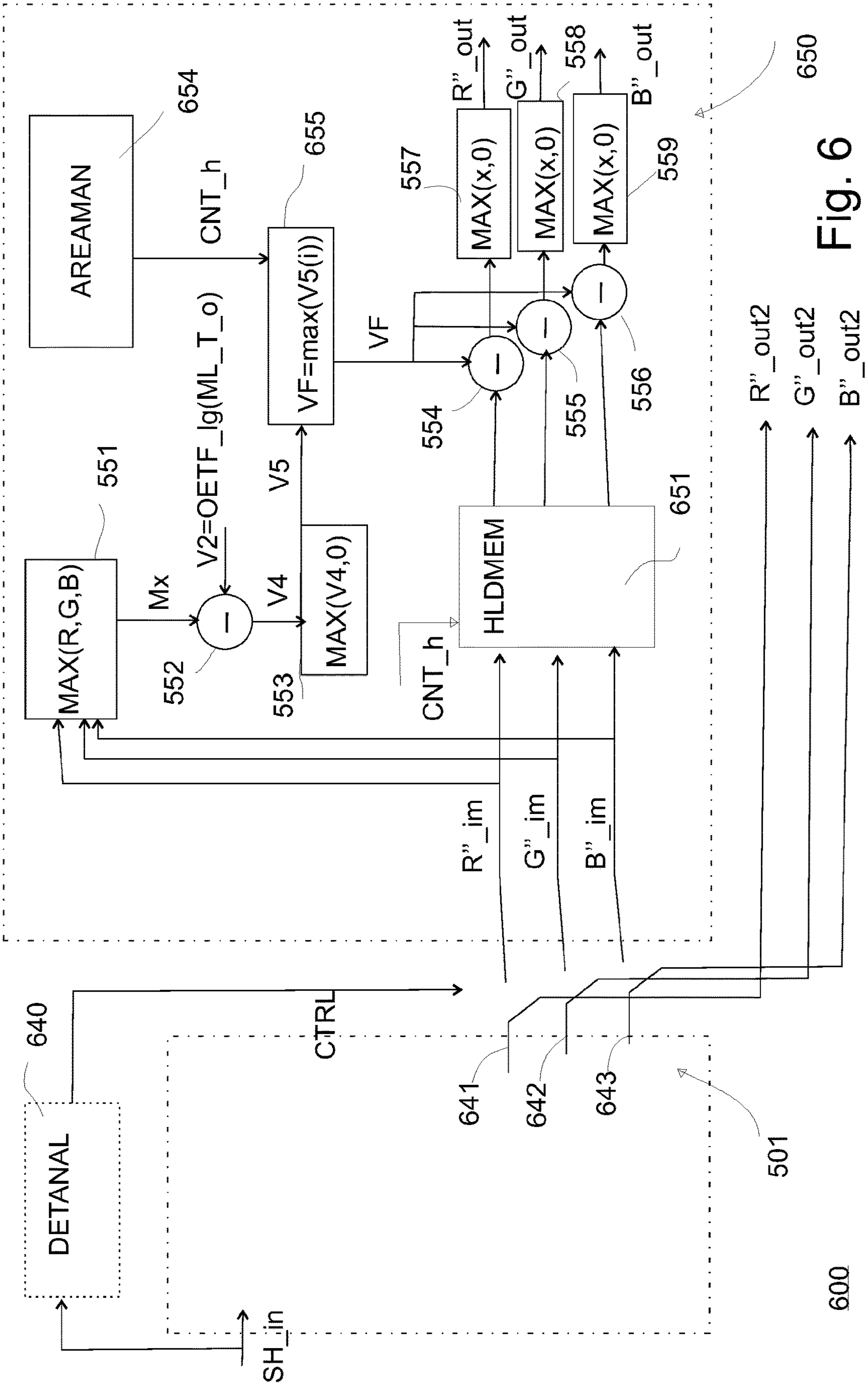
FIG. 6 schematically shows how several more advanced calculation components can be added into the basic circuit, to make a more complicated but potentially better quality variant.

FIG. 6 shows some possibilities to make a more advanced apparatus (600) from the basic concept, which can work apart, but also elegantly together. Detail analyzer 640 can apply some analysis of how many colors there are, and how each out-of-gamut-compensation algorithm would do reasonably well or badly. It may control switches 641, 642, and 643, which in this example bypass the out-of-gamut algorithm altogether, and output the intermediate color components as alternative output components (R"_out2, G"_out2, B"_out2). This may still be processed by another television color circuit, or not, in which latter case the "strange" internal detail of the wrong color is considered better than what would come out of e.g. the simple out-of-gamut processing embodiment. The switches are set to their appropriate position by a control signal (CTRL) which comes from e.g. the detail measure (DM) for a pixel to be transformed (e.g. the standard deviation from some dominant graphics color) being smaller than a threshold (ThM). The detail analyzer can in principle do any processing pre-analyzing buffered images, since embodiments of the present innovation may be in-between several other image processing blocks before or behind it, although it may be desirable if the simple processing does all the needed correction to satisfaction on its own. More advanced control signals, from detailed analysis of the input image colors, may switch between several processing options (or non-processing), the simple embodiment typically being one of them.

In the sub-circuit 650 we have also shown some interesting alteration. A number of pixels, e.g. controlled by a counter CNT_h (which works particularly well if a particular region is scanned first on its own; alternative hardware realizations should be understandable for the skilled person), may be buffered in a memory 651, until a final aggregate fifth value VF is determined, and they can be processed. An area managing circuit 654 will arrange this. E.g., if the logo resides in a 100 pixels by 100 pixels logo area, it may count till 10,000. Aggregate factor calculation circuit 655 will calculate the aggregate factor VF for that region. The simplest variant is calculating which of the fifth values is the highest and use that one as VF, though other algorithms may also be used. The control by area managing circuit 654 will also be done on this circuit 655, e.g. by keeping maximizing until the CNT_h has been exhausted. More complex area management may e.g. determine a bit pattern for which pixels in the rectangle, or another logo area, to do which processing. If some processing is not to be done or changed, these embodiments can elegantly work together with the detail analyzer circuit (640), to work out the best situation from the total information (but detail analyzer and aggregation can also be used on their own). The gamma-log-based out of gamut processing can be combined with other techniques, e.g. pre- or post-processing, or alternating with other out of gamut techniques on a pixel by pixel or region by region processing. E.g. the creator of the video or image content (a human or automaton) may indicate e.g. in metadata of the video signal a rectangle where this algorithm is not to be applied (or is to be applied), where it may be applied in the rest of the image. This may be used to protect e.g. a logo which gets colors projected to upper gamut colors which are too similar, to still see the original logo. I.e. in such a scenario it may sometimes be better to see the logo with deformed colors, but at least its geometrical structure easily perceivable. This may be useful if e.g. logos are not post-applied to the video, but e.g. already present in the camera captured video, like on a t-shirt, or a décor background etc. Sometimes a human in charge may decide this, in an acceptance pass. E.g. he may quickly click (or drag) diagonal line points defining the upper-left and lower-right points of a rectangle, and those coordinates can be communicated in metadata as a protected area, where the present method should not be applied. In more advanced scenarios the video creator may indicate another algorithm to be used by receivers, or a receiver may elect its own processing, or do no out of gamut correction (i.e. color clipping), etc. Bit maps may be generated for doing more precise per pixel processing (e.g. 1=apply; 0 means do not apply), and such bit maps may also be communicated in metadata of the communicated video signal, or generated inside the receiver by applying some pixel discrimination algorithm (which may also be selected by communicating a determiner value specifying which one of several preconfigured algorithms to apply), etc.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection-wired or wireless-, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A method of transforming an input pixel color of a high dynamic range input image into an output color of an output image, wherein the input color is represented as a gamma-log-defined triplet comprising an initial first color component, an initial second color component and an initial third color component according to an opto-electronic transfer function which has a gamma-log shape, wherein the initial first, second and third color component are transformed into an intermediate red color component, an intermediate green color component and an intermediate blue color component by mapping the initial color components with a function which is the same for each color component, wherein the function has a slope larger than 1 for a sub-range comprising the darkest color component values of the initial color components, characterized in that the intermediate color components are transformed into a corresponding red output color component, green output color component, and blue output color component by applying:

- calculating a first value which is for each input color of a pixel being processed the largest one of the three intermediate color components;
- subtracting from the first value a second value which second value is equal to a value obtained from applying the opto-electronic transfer function to a tertiary value, which tertiary value is equal to a target display maximum luminance of the output image divided by a maximum luminance of the opto-electronic transfer function, the subtracting yielding a fourth value;
- calculating a fifth value by determining the highest one of the fourth value and zero; and
- calculating the three output color components by subtracting the fifth value from the corresponding intermediate color component, and setting the output color component equal to zero if the subtraction yields a negative value.

2. The method of transforming an input pixel color as claimed in claim 1, in which the fifth value is obtained as the maximum one of successively calculated fifth values for a set of pixels of the input image.

3. The method of transforming an input pixel color as claimed in claim 2, comprising a color detail analyzer, arranged to determine a detail measure for a pixel to be transformed, and applying the transformation if the detail measure is smaller than a threshold.

4. The method of transforming an input pixel color as claimed in claim 1, comprising a color detail analyzer, arranged to determine a detail measure for a pixel to be transformed, and applying the transformation if the detail measure is smaller than a threshold.

5. An apparatus for transforming an input pixel color of a high dynamic range input image into an output color of an output image, wherein the input color is represented as a gamma-log-defined triplet comprising an initial first color component, an initial second color component and an initial third color component according to an opto-electronic transfer function which has a gamma-log shape, wherein the apparatus comprises a color transformation circuit arranged to transform the initial first, second and third color component into an intermediate red color component, an intermediate green color component and an intermediate blue color component by mapping the initial color components with a function which is the same for each color component, wherein the function has a slope larger than 1 for a sub-range comprising the darkest color component values of the initial color components, characterized in that the apparatus comprises:

- a first maximization circuit arranged to calculate a first value which is for each input color the largest one of the three intermediate color components;
- a first subtractor arranged to subtract from the first value a second value which is equal to a value obtained from applying the opto-electronic transfer function to a tertiary value, which tertiary value is equal to a target display maximum luminance for the output image divided by a maximum luminance associated with the opto-electronic transfer function, which subtraction yields a fourth value;
- a second maximization circuit arranged to calculate a fifth value which is the highest one of the fourth value and zero;
- a second subtractor, a third subtractor and a fourth subtractor arranged to calculate three output color components by subtracting the fifth value from the corresponding intermediate color component, and arranged to set the output color component equal to zero if the subtraction yields a negative value.

6. The apparatus for transforming an input pixel color of a high dynamic range input image as claimed in claim 5, comprising a sixth maximization circuit arranged to yield an aggregate fifth value which is obtained as the maximum one of successively calculated fifth values for a set of pixels of the input image.

7. The apparatus for transforming an input pixel color of a high dynamic range input image as claimed in claim 6, comprising a color detail analyzer circuit arranged to determine an amount of color detail, and therefrom a control signal controlling whether to apply the processing starting with the calculation of the first value, or yield as alternative output color components the intermediate color components, for at least a region of the input image.

8. The apparatus for transforming an input pixel color of a high dynamic range input image as claimed in claim 5, comprising a color detail analyzer circuit arranged to determine an amount of color detail, and therefrom a control signal controlling whether to apply the processing starting with the calculation of the first value, or yield as alternative output color components the intermediate color components, for at least a region of the input image.

* * * * *